(12) United States Patent
Peter

(10) Patent No.: US 7,114,401 B2
(45) Date of Patent: Oct. 3, 2006

(54) APPARATUS AND METHODS FOR ABRASIVE FLUID FLOW METER

(75) Inventor: Andreas Peter, Niedersachsen (DE)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 10/920,863

(22) Filed: Aug. 18, 2004

(65) Prior Publication Data

US 2006/0037408 A1   Feb. 23, 2006

(51) Int. Cl.
*G01F 1/44*   (2006.01)

(52) U.S. Cl. ................................ 73/861.63

(58) Field of Classification Search ......... 73/861.52, 73/861.63, 861.42, 861.53, 861.61, 861.44, 73/720, 861.24, 152.29, 152.02
See application file for complete search history.

(56) References Cited

U.S. PATENT DOCUMENTS

| | | | |
|---|---|---|---|
| 4,262,343 A | 4/1981 | Claycomb | |
| 4,604,902 A | 8/1986 | Sabin et al. | |
| 5,127,173 A | 7/1992 | Thurston et al. | |
| 5,226,728 A | 7/1993 | Vander Heyden | |
| 5,351,521 A | 10/1994 | Cracknell | |
| 6,041,659 A * | 3/2000 | Wilda et al. | 73/720 |
| 6,065,486 A | 5/2000 | Vetterick et al. | |
| 6,308,561 B1 * | 10/2001 | Samworth et al. | 73/152.02 |
| 6,395,415 B1 * | 5/2002 | Hoehn et al. | 429/22 |
| 6,561,043 B1 * | 5/2003 | Bailey | 73/861.52 |
| 6,577,144 B1 | 6/2003 | Vail, III et al. | |
| 6,698,297 B1 * | 3/2004 | Gysling | 73/861.63 |
| 6,715,367 B1 | 4/2004 | Gonzales et al. | |
| 6,799,634 B1 * | 10/2004 | Hartog et al. | 166/250.12 |
| 6,834,556 B1 * | 12/2004 | Cain et al. | 73/861.24 |

FOREIGN PATENT DOCUMENTS

DE   1 648 173   4/1971

* cited by examiner

*Primary Examiner*—Jewel V. Thompson
(74) *Attorney, Agent, or Firm*—Madan, Mossman & Sriram, P.C.

(57) ABSTRACT

A system and method provides a flow measurement system for steady-state and transient flow. A housing contains a sleeve such that the sleeve is isolated from external mechanical loads. A flow measurement element, such as a venture or nozzle, is located in the sleeve. Strains along the sleeve caused by flow pressure changes through the flow element are detected and related to fluid flow rate.

42 Claims, 5 Drawing Sheets

APPARATUS AND METHODS FOR ABRASIVE FLUID FLOW METER

CROSS-REFERENCE TO RELATED APPLICATIONS

Not applicable

STATEMENT REGARDING FEDERALLY SPONSORED RESEARCH OR DEVELOPMENT

Not applicable

BACKGROUND OF THE INVENTION

1. Field of the Invention

This invention relates to flow measurement of abrasive fluids and more particularly to a flow meter suitable for use in a drilling tubular.

2. Description of the Related Art

Drilling systems for oil and gas production commonly include a drilling fluid flowing down a tubular member in a borehole and back up to the surface. The drilling fluid serves several purposes known in the art, such as removing cuttings from the wellbore. The drilling fluid is a mixture of a liquid with solid particles in suspension. As is known in the art, some of the solids may be added to the liquid to control the viscosity and gel strength of the liquid, for example, to maintain the cuttings in suspension in the drilling fluid. Other solids, such as barite, may be added to control the hydrostatic pressure near the bottom of the wellbore, so as to control formation fluid flow into the wellbore. The drilling fluid inside the tubular member may be at relatively high pressure and be at flow rates in the range of 100 gpm to over 1000 gpm. Measurement of the flow rate of the drilling fluid in such a situation is problematic.

Common obstruction type flow meters, such as orifice plates, result in unacceptable pressure losses across the flow metering section. FIG. 1 depicts a common venturi type meter where the flow is accelerated through the gradually reducing conically tapered nozzle section to the minimum area at the throat section. The accelerated flow has a related static pressure drop between the entrance pressure port and the throat pressure port with the pressure drop being determinable from Bernoulli's equation, well known to those skilled in the art. The fluid flow expands and diffuses in the gradually tapered diffuser section such that as much as 75% of the pressure drop is recovered. The pressure differential between the entrance and the throat may be detected by a differential pressure transducer known in the art. The system as described in FIG. 1, however, has serious drawbacks when used in a drilling fluid flow system. For example, when the flow meter is located in a vertical orientation, the solids in the drilling fluid have a tendency to settle out in and clog the fluid lines leading from the pressure ports to the differential pressure sensor. In addition, the sensing pressure ports create a flow disturbance that leads to locally accelerated erosion caused by the particles in the drilling fluid impinging on the port.

Thus, there is a demonstrated need for a flow meter that is suitable for use in abrasive fluid flow and is resistant to clogging and erosion.

SUMMARY OF THE INVENTION

In one aspect, the present invention provides a system for measuring a fluid flow comprising a housing adapted to be inserted in a flowline. A sleeve is adapted to fit into the housing. The sleeve has a flow measuring element disposed therein such that the flow element generates a pressure difference across the flow element related to a flow rate of the fluid flow therethrough. A first seal and a second seal act cooperatively with the sleeve and the housing to form a sealed volume between a portion of the sleeve and the housing. A first strain sensor is attached to the sleeve at a first predetermined location and generates a first signal related to a fluid pressure in the sleeve upstream of the flow element. A second strain sensor is located on the sleeve at a second predetermined location spaced apart axially from the first strain sensor and generates a second signal related to a fluid pressure in the sleeve at the second predetermined location. The difference between the first signal and the second signal is related to a flow rate of the fluid inside the sleeve.

In another aspect, a method for measuring a fluid flow comprises inserting a housing in a flowline. A sleeve is adapted to fit into the housing. The sleeve has a flow measuring element disposed therein such that the flow element generates a pressure difference across the flow element where the pressure difference is related to a flow rate of the fluid flow through the sleeve. A first seal and a second seal act cooperatively with the sleeve and the housing to form a sealed volume between a portion of the sleeve and the housing. A first strain sensor is attached to the sleeve at a first predetermined location and generates a first signal related to a fluid pressure in the sleeve at the first predetermined location. A second strain sensor is located on the sleeve at a second predetermined location spaced apart axially from the first strain sensor and generates a second signal related to a fluid pressure in the sleeve at the second predetermined location. The difference between the first signal and the second signal is related to a flow rate of the fluid inside the sleeve.

BRIEF DESCRIPTION OF THE DRAWINGS

For detailed understanding of the present invention, references should be made to the following detailed description of the embodiments, taken in conjunction with the accompanying drawings, in which like elements have been given like numerals, wherein.

DESCRIPTION OF EMBODIMENTS

Figure 1:
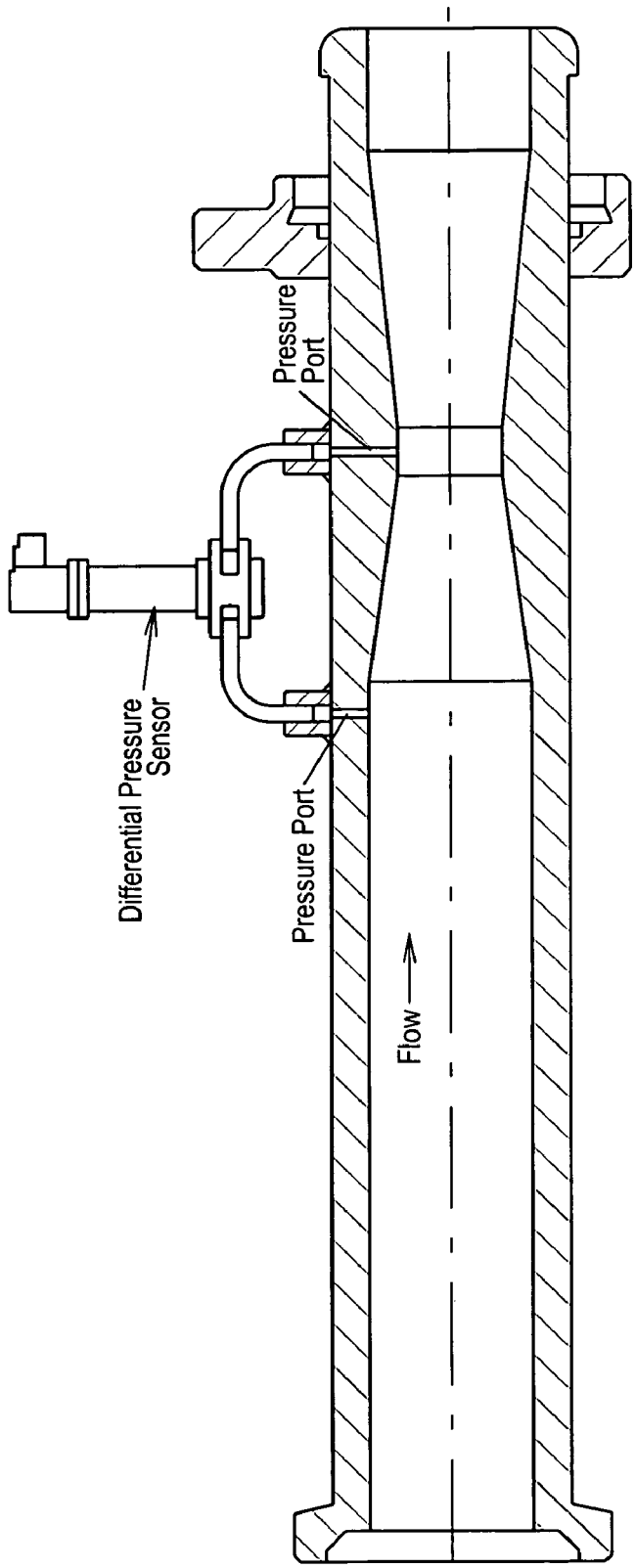
FIG. 1 is a sketch of a prior art flow measuring device.
Figure 2:
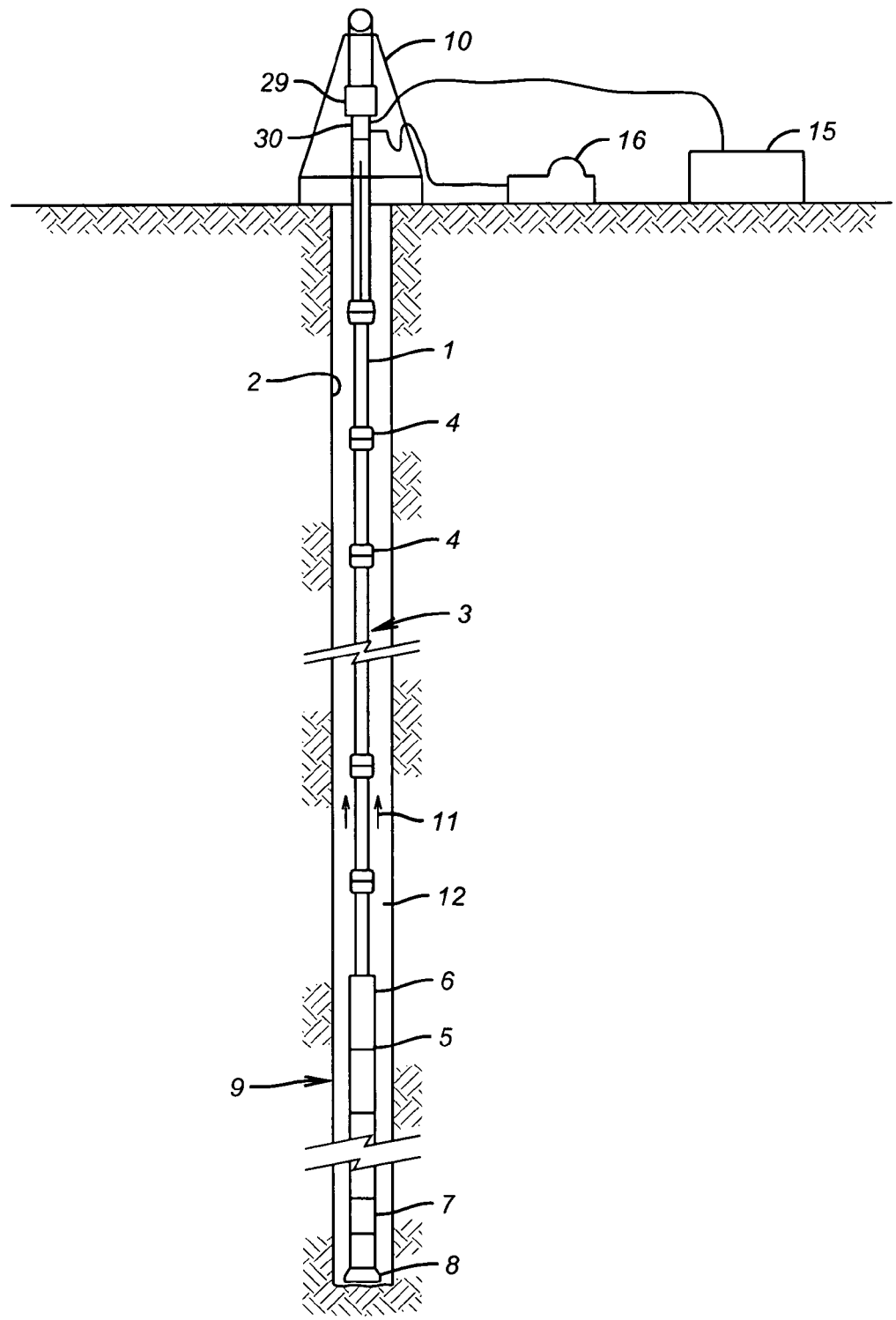
FIG. 2 is a sketch of a drilling system having a flow measurement system according to one embodiment of the present invention.

In one embodiment, see FIG. 2, and described herein as an example and not as a limitation, a drilling operation has a derrick 10 for supporting a drill string 3 in a borehole 2, also called a wellbore. Supported in derrick 10 is a top drive 29 for rotating drill string 3. Drill string 3 comprises multiple sections of drill pipe 1 connected together by threaded connections 4. A bottomhole assembly 9 is attached to the bottom end of drill string 3 and has a drill bit 8 attached to a bottom end thereof. Drill bit 8 is rotated to drill through the earth formations. Bottomhole assembly 9 comprises multiple sections of drill collars 6 and may have a measurement while drilling (MWD) system 7 attached therein, above bit 8. Drill collar sections 6 and MWD system 7 are connected through threaded connections 5. Measurement while drilling, and/or logging while drilling (LWD), systems are well known in the art. Such systems commonly measure a number of parameters of interest regarding the drilling operation, the formations surrounding the borehole 2, and the position and direction of the drill bit 8 in the borehole 2. Such systems may include downhole processors (not shown) to provide open or closed loop control, in conjunction with a steerable system (not shown), of the borehole 2 path toward a predetermined target in a subterranean formation. In an alternative embodiment, a kelly drive (not shown), of a kind known in the art, may be used to rotate drill string 3.

Drilling fluid 11, commonly called drilling mud, is pumped by pump 16 through the drill string 3, exits the bit 8 and returns back to the surface in the annulus 12 between drill string 3 and borehole 2. Drilling flow rates may commonly range from the order of 100 gpm to in excess of 1000 gpm, depending, at least to some extent, on the borehole size and the ability of the fluid to remove the cuttings from the borehole. Drilling fluid discharge pressure of pump 16 is commonly in the excess of 1000 psi.

As is known in the art, MWD system 7 may transmit data obtained by sensors in MWD 7 by transmitting encoded pressure signals in drilling fluid 11 to a surface sensor 30, where the encoded pressure signals are detected. A number of devices are known in the art for creating such pulses. In one common device, a positive pressure signal is generated by partially impeding a portion of the flow of drilling fluid 11. In another device, a negative pressure signal is generated by partially venting a portion of the flow of drilling fluid 11 from inside the drill string 3 to the annulus 12. In these examples, the positive and negative reference is relative to the overall static pressure level in the drilling fluid 11 as it flows through the drill string 3. In yet another common arrangement, a continuous wave is generated that propagates to the surface. In each device, a pressure signal is generated that propagates through the drilling fluid 11 in drill string 3 to a surface sensor 30 where it is detected and transmitted electrically to a processor 15 for decoding and interpretation. Commonly, surface sensor 30 is a pressure sensor that detects the pressure pulse that propagates to the surface. One skilled in the art will realize that the pressure pulse induced in the drilling fluid flow has a related flow velocity change determined by the relationship quantifying the water hammer effect, see U.S. Pat. No. 4,262,343 to Claycomb. The pressure change-velocity change relationship is of the form:

$$\Delta P = \rho C \Delta V \qquad (1)$$

where, $\Delta P$=the magnitude of the pressure pulse, $\rho$=the fluid mass density;

C=the acoustic velocity of the fluid, also called the sound speed of the fluid; and $\Delta V$=the change in the fluid velocity.

Figure 3:
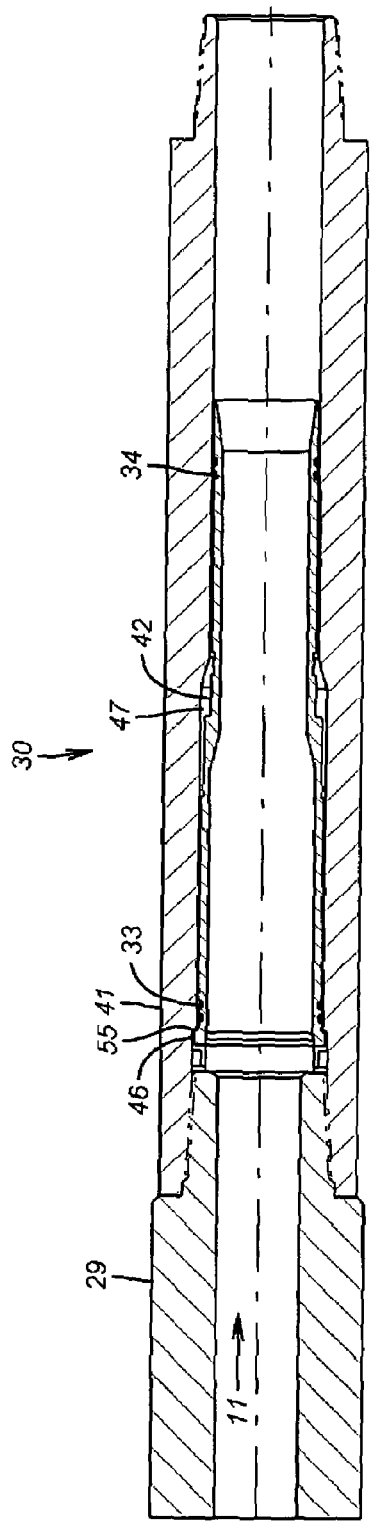
FIG. 3 is a sketch of one embodiment of a flow measurement system.
Figure 4:
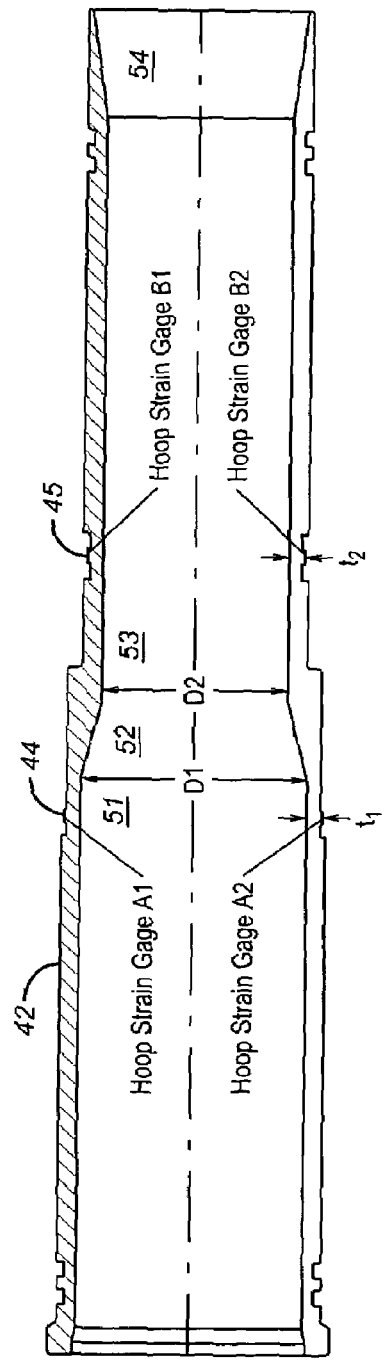
FIG. 4 is a sketch of a sleeve component used in one embodiment of the present invention.

In one embodiment of the present invention, surface sensor 30 is a flow meter as shown in FIGS. 3 and 4. Housing 41 is attached to the bottom end of top drive 29. The other end of housing 41 is adapted to attach to drill string 3 (see FIG. 2). Alternatively, housing 41 may be inserted in the high pressure flow line between pump 16 and top drive 29. Housing 41 has a land 55 adapted to contact upset 46 on sleeve 42 and position sleeve 42 in housing 41. Seals 33 and 34 seal the ends of sleeve 42 to housing 41 and prevent the intrusion of drilling fluid 11 into the volume 47 between sleeve 42 and housing 41. The volume 47 contains a gas, for example air, at substantially atmospheric pressure. External mechanical loads on housing 41, such as bending and tension, are substantially isolated from sleeve 42.

Sleeve 42 is dimensioned such that the volume 47 is formed by a predetermined gap between the outer diameters of sleeve 42 and the corresponding inner diameters of housing 41. The dimensions of sleeve 42 and housing 41 are selected, using techniques known in the art, such that under the maximum expected internal pressure of drilling fluid 11, sleeve 42 does not expand to contact housing 41 along the length between seals 33 and 34.

The internal surface of sleeve 42 forms flow measuring element such as a venturi type section for determining the flow rate through sleeve 42. Sleeve 42 has an entrance region 51 of diameter D1, a conically reducing tapered nozzle section 52 that tapers to a straight section 53 of diameter D2. As one skilled in the art will appreciate, from the classical Bernoulli relationship, as flow passes from section 51 to section 53, at a substantially constant flow rate, the fluid velocity will increase and the fluid static pressure will decrease. The difference in pressure between section 51 and section 53 is related to the volumetric flow rate of the fluid. Changes in internal pressure cause changes in the hoop strains and stresses in sleeve 42 that can be detected and related to flow. The flow is allowed to expand in diffuser section 53 such that a major portion of the pressure difference is recovered in the downstream flow. Different sizes of sleeve 42 may be used for different flow ranges. In addition, should sleeve 42 exhibit erosive wear, it is easily replaced. The internal surface of sleeve 42, or a portion thereof may be coated with abrasion and/or erosion resistant coatings, for example tungsten carbide coatings.

Strain gages A1 and A2 are mounted on a diameter 44 on sleeve 42. Gages A1 and A2 are mounted substantially 180 degrees apart, as shown. Likewise gages B1 and B2 are mounted on diameter 45 on sleeve 42. In one embodiment, lands 44 and 45 are each dimensioned such that hoop strains caused by an equal internal pressure are equal at the two lands. For example, the wall thickness $t_1$ may be greater than thickness $t_2$ because the diameter of section 51 is greater than that of section 53, as one skilled in the art will appreciate.

Figure 5:
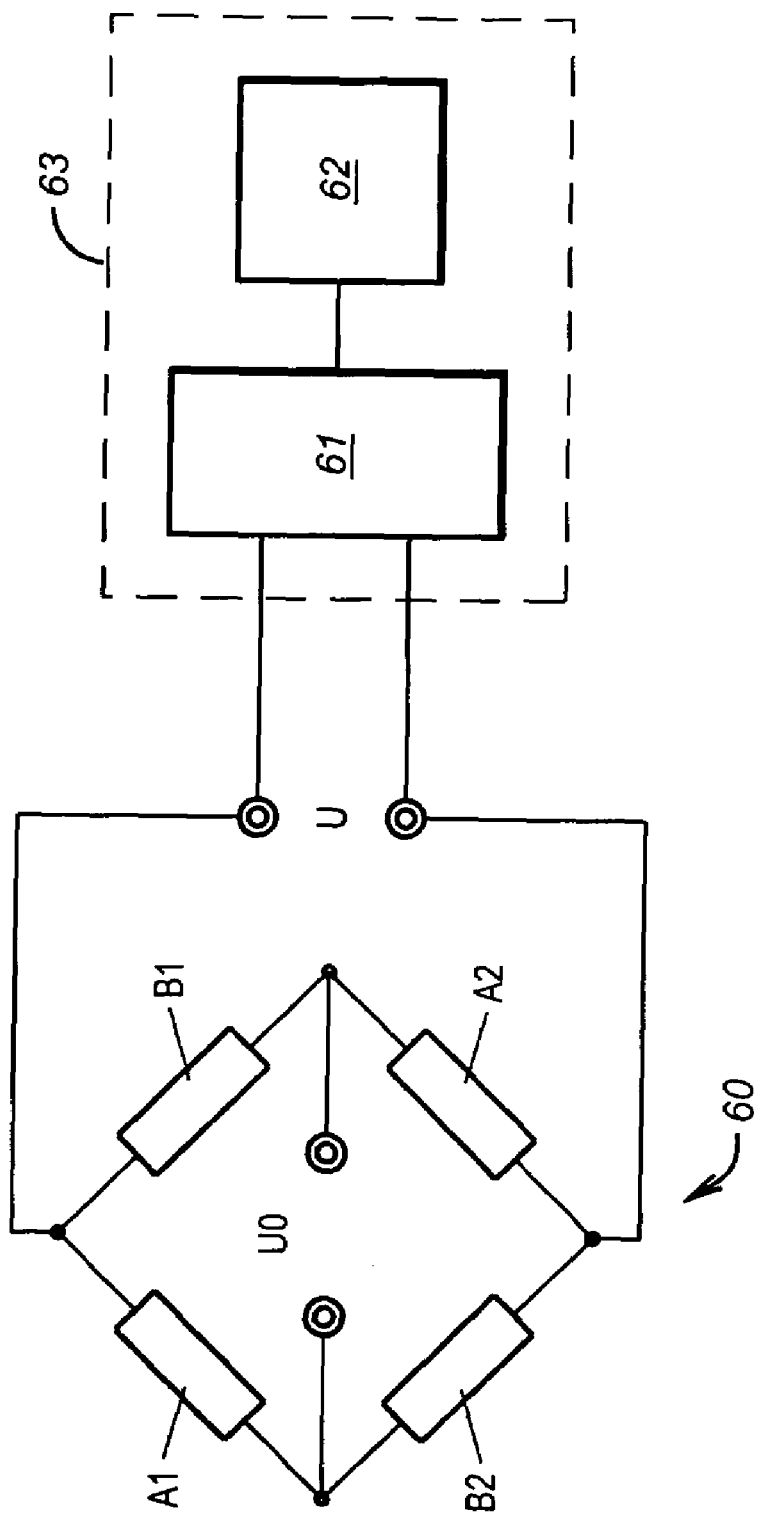
FIG. 5 is a schematic of a circuit used in conjunction with one embodiment of the present invention.

FIG. 5 shows one embodiment for detecting the pressure differential for use with resistance type the strain gages. Gages A1, A2, B1, B2 are connected electrically by wires and feedthroughs (not shown) in a wheatstone bridge 60, where $U_0$ is the excitation voltage applied to the bridge and U is the output of the bridge that is related to the pressure differential between section 51 and section 53. The use of such an arrangement is known in the art. Note that such a bridge provides temperature compensation because all gages experience substantially the same temperature and thermal expansion. Bending moments acting on the sleeve are compensated because gages on opposite sides of the sleeve are located in opposite arms of the bridge and cancel each other. Static internal pressure inside the sleeve is substantially compensated for as all gages are strained similarly by the internal pressure. Therefore, the output voltage, U, is an indication of the pressure difference between sections 51 and 53 that is related to volumetric flow of the fluid through sensor 30. Output U may be connected to control module 63 that contains signal conditioning circuits 61 and processor 62 for converting the output to usable information. Control module 63 also contains circuits to provide power to strain sensors A1, A2, B1, B2. Processor 62 may be a computer with memory and permanent storage capability of a kind known in the art.

Figure 6:
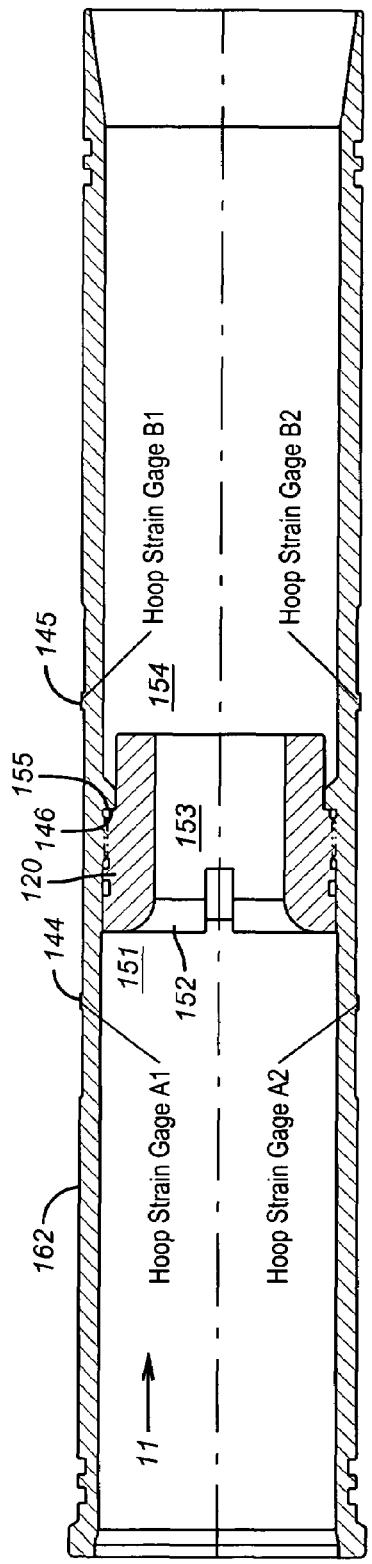
FIG. 6 is a schematic of a sleeve having a replaceable flow measurement element used in one embodiment of the present invention.

In an alternative embodiment, see FIG. 6, sleeve 162 is adapted to fit into housing 41 previously described. In this embodiment, a flow element, such as nozzle 120, is inserted in sleeve 162 and drilling fluid 11 flows therethrough. Nozzle 120 has a predetermined entrance region 152 that accelerates the fluid flow from the entrance section 151 to the throat section 153 and discharges the flow into the exit section 154. As one skilled in the art will appreciate, the flow in the exit section encounters a substantial pressure loss such that there is a measurable pressure differential between entrance section 151 and exit section 154. Such a device is similar to commonly used flow nozzle measuring devices. This pressure differential can be related to the flow rate using standard techniques. The pressure differential can be detected by strain gages located at lands 144 and 145 using techniques previously described. Sleeve 162 allows the thickness of lands 144 and 145 to be equal, thereby simplifying calibration. Nozzle 120 may have an abrasion and/or erosion resistant coating deposited on its flow exposed surfaces. Alternatively, nozzle 120 may be manufactured of a material that is resistant to erosion and/or abrasion by drilling fluid 11. Such materials include, but are not limited to, ceramics and tungsten carbide.

Figure 7:
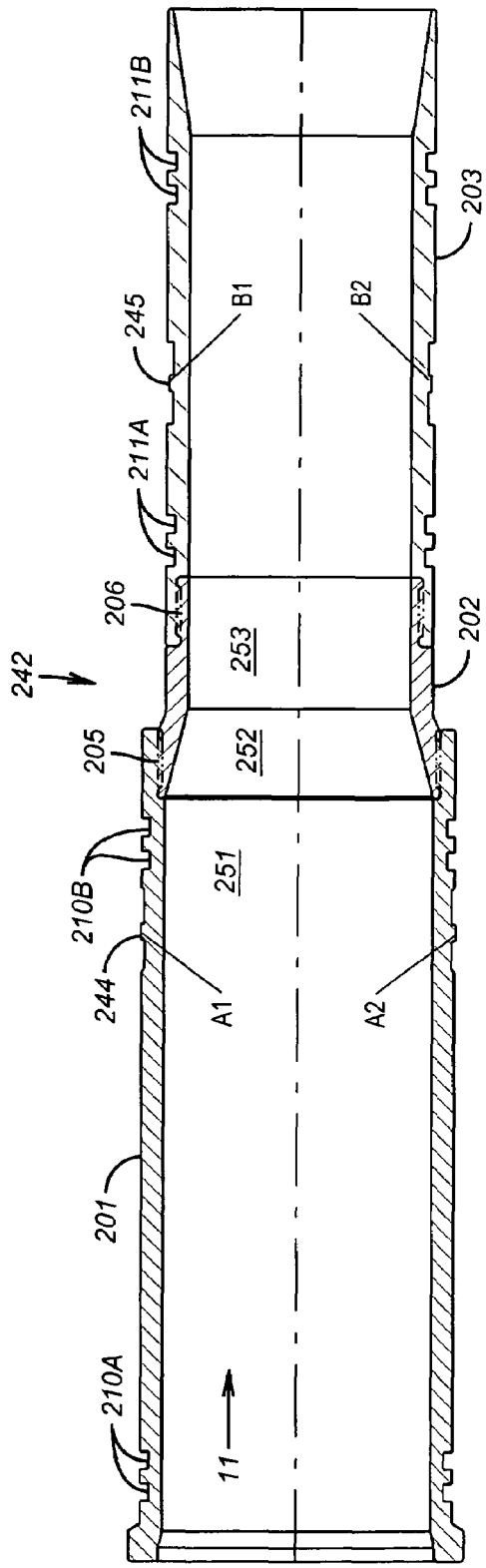
FIG. 7 is schematic of a multi-component sleeve used in one embodiment of the present invention.

In another embodiment, see FIG. 7, sleeve 242 is adapted to fit into housing 41 of FIG. 3. Sleeve 242 comprises sections 201, 202, and 203 that are connected together by threaded connections 205 and 206. Alternatively, connections 205 and 206 may be comprise any suitable mechanical connection, such as, for example, brazing, welding, and shrink fitting. Seals (not shown) are inserted in grooves 210A,B and 211 A,B and act cooperatively with housing 41 to provide isolated volumes (similar to volume 17 of FIG. 3) between sections 201, 203 and housing 41. Measurement lands 244 and 245 are disposed on sections 201 and 203, respectively, and have strain gages A1, A2 and B1, B2 mounted, respectively, thereon. Flow 11 passes through sleeve 242 and is accelerated from section 251 through the conically converging region 252 and passes into section 253. The strains imposed on gages A1, A2 and B1, B2 by the flow are detected and related to the flow of fluid 11, as described previously. The multi-component nature of sleeve 242 allows for ease of replacement for changing flow ranges and/or for replacing worn sections. Any of the sections 201, 202, 203 may be manufactured of an erosion resistant material and/or be coated with an erosion resistant material, as described previously.

In another alternative embodiment, the volume between any of the sleeves previously described and their associated housing contains a liquid, for example, an oil. The liquid is substantially incompressible and can, therefore, transmit forces from the sleeve to housing 41, and, therefore, the sleeve does not need to be able to hold the static pressure of the drilling fluid. The static pressure of the drilling fluid is transmitted from the sleeve to housing 41. The wall thickness of such a sleeve can be made much thinner in this embodiment. Deformations of the sleeve due to the static internal pressure are very low, and substantially the same at lands the strain gage locations. These deformations therefore create almost no signal from the strain gages. Deformations of the sleeve, in response to the pressure differential, are much larger than in the before mentioned embodiments, because of the reduced sleeve wall thickness. The resulting signal from the strain gages is therefore also much larger and easier to detect.

The flow sensors described above, use resistance strain gages for detecting strains at predetermined locations along a sleeve. Alternatively, any suitable strain sensing device may be used, including, but not limited to, piezoelectric elements, piezoresistive elements, capacitive devices, and fiber optic strain sensing devices.

As discussed previously, pressure signals encoded and transmitted by the drilling fluid 11 also manifest themselves as velocity and flow fluctuations that are related to the pressure fluctuations by Eq. 1. The flow fluctuations can be detected by the flow sensor described by FIGS. 3–7 and can be used to decode the signals transmitted from downhole.

The foregoing description is directed to particular embodiments of the present invention for the purpose of illustration and explanation. It will be apparent, however, to one skilled in the art that many modifications and changes to the embodiment set forth above are possible. It is intended that the following claims be interpreted to embrace all such modifications and changes.

What is claimed is:

1. A system for measuring a fluid flow comprising:
   a housing adapted to be inserted in a flowline;
   a sleeve adapted to sealably fit into said housing such that a predetermined gap exists between said sleeve and said housing and wherein said sleeve is substantially isolated from mechanical loads on said housing;
   a flow measuring element disposed in the sleeve such that the flow measuring element generates a pressure difference across said flow measuring element related to a flow rate of the fluid flow therethrough; and
   a first strain sensor attached to the sleeve upstream of the flow measuring element and generating a first signal related thereto, and a second strain sensor attached to the sleeve downstream of the flow measuring element and generating a second signal related thereto, wherein a difference between the first strain sensor signal and the second strain sensor signal is related to a flow rate of the fluid inside the sleeve.

2. The system of claim 1, further comprising a first seal and a second seal acting cooperatively with said sleeve and said housing to form a sealed volume between a portion of said sleeve and said housing.

3. The system of claim 2, wherein the first seal and the second seal are made of an elastomeric material.

4. The system of claim 2, wherein the sealed volume contains a fluid chosen from the group consisting of (i) a gas at substantially atmospheric pressure, and (ii) a liquid.

5. The system of claim 1, wherein the flow measuring element is one of (i) a venturi element, and (ii) a nozzle element.

6. The system of claim 1, wherein the flow measuring element has a wear resistant coating applied to an inside surface of the flow measuring element.

7. The system of claim 1, wherein the flow measuring element comprises multiple sections.

8. The system of claim 7, wherein at least one of the multiple sections is made of an erosion resistant material.

9. The system of claim 1, wherein the first strain sensor and the second strain sensor are resistance strain gages.

10. The system of claim 1, wherein the first strain sensor and the second strain sensor are piezoelectric elements.

11. The system of claim 1, wherein the first strain sensor and the second strain sensor are piezoresistive elements.

12. The system of claim 1, wherein the first strain sensor and the second strain sensor are fiber optic strain sensors.

13. The system of claim 1, further comprising a control module containing circuits for powering said first strain sensor and said second strain sensor and detecting said first signal and said second signal.

14. The system of claim 13, wherein the control module her comprises a processor and memory acting under programmed instructions for relating the difference between said first signal and said second signal to the fluid flow in the sleeve.

15. The system of claim 1, wherein the fluid contains solid particles.

16. The system of claim 1, wherein the fluid is a drilling fluid.

17. The system of claim 1, wherein a first sleeve wall thickness at the upstream stain sensor location and a second wall thickness at the downstream strain sensor location are each predetermined such that a first hoop strain at the upstream strain sensor location is substantially the same as a second hoop strain at the downstream stain sensor location when said upstream strain sensor location and said downstream strain sensor location are exposed to substantially equal internal pressure.

18. The system of claim 1, wherein the flow rate comprises a steady-state component and a time-varying component.

19. The system of claim 18, wherein the time-varying component is related to a predetermined signal transmitted in the drilling fluid.

20. The system of claim 19, wherein the predetermined signal is a mud pulse telemetry signal.

21. The system of claim 1, wherein the flow measuring element is integrally formed as part of the sleeve.

22. A method for measuring a fluid flow comprising:
inserting a housing in a flowline;
adapting a sleeve to sealably fit into said housing such that a predetermined gap exists between said sleeve and said housing;
disposing a flow measuring element in said sleeve such that said flow measuring element generates a pressure difference across said flow measuring element related to a flow rate of the fluid flow therethrough; and
attaching a first strain sensor to said sleeve at a location upstream of the flow measuring element and generating a first strain sensor signal related thereto, and attaching a second strain sensor on the sleeve at a location downstream of the flow measuring element and generating a second strain sensor signal related thereto, wherein a difference between the first strain sensor signal and the second strain sensor signal is related to a flow rate of the fluid inside the sleeve.

23. The method of claim 22, further comprising providing a first seal and a second seal, both seals acting cooperatively with said sleeve and said housing to form a sealed volume between a portion of said sleeve and said housing.

24. The method of claim 23, wherein the first seal and the second seal are made of an elastomeric material.

25. The method of claim 23, wherein the sealed volume contains a fluid chosen from the group consisting of (i) a gas at substantially atmospheric pressure, and (ii) a liquid.

26. The method of claim 22, wherein the flow measuring element is one of (i) a venturi element, and (ii) a nozzle element.

27. The method of claim 23, wherein the flow measuring element has a wear resistant coating applied to an inside surface of the flow measuring element.

28. The method of claim 22, wherein the flow measuring element comprises multiple sections.

29. The method of claim 28, wherein the flow measuring element is made of an erosion resistant material.

30. The method of claim 22, wherein the first strain sensor and the second strain sensor are resistance strain gages.

31. The method of claim 22, wherein the first strain sensor and the second strain sensor are piezoelectric elements.

32. The method of claim 22, wherein the first strain sensor and the second strain sensor are piezoresistive elements.

33. The method of claim 22, wherein the first strain sensor and the second strain sensor are fiber optic strain sensors.

34. The method of claim 22, further comprising a control module containing circuits for powering said first strain sensor and said second strain sensor and detecting said first signal and said second signal.

35. The method of claim 22, wherein the control module further comprises a processor and memory acting under programmed instructions for relating the difference between said first signal and said second signal to the fluid flow in the sleeve.

36. The method of claim 22, wherein the fluid contains solid particles.

37. The method of claim 22, wherein the fluid is a drilling fluid.

38. The method of claim 22, wherein a first sleeve wall thickness at the upstream strain sensor location and a second wall thickness at the downstream strain sensor location are each predetermined such that a first hoop strain at the upstream strain sensor location is substantially the same as a second hoop strain at the downstream strain sensor location when said upstream strain sensor location and said downstream stain sensor location are exposed to substantially equal internal pressure.

39. The method of claim 22, wherein the flow rate comprises a steady-state component and a time-varying component.

40. The method of claim 39, wherein the time-varying component is related to a predetermined signal transmitted in the drilling fluid.

41. The method of claim 40, wherein the predetermined signal is a mud pulse telemetry signal.

42. The system of claim 22, wherein the flow measuring element is integrally formed as part of the sleeve.

* * * * *